MICROPHOTO 1
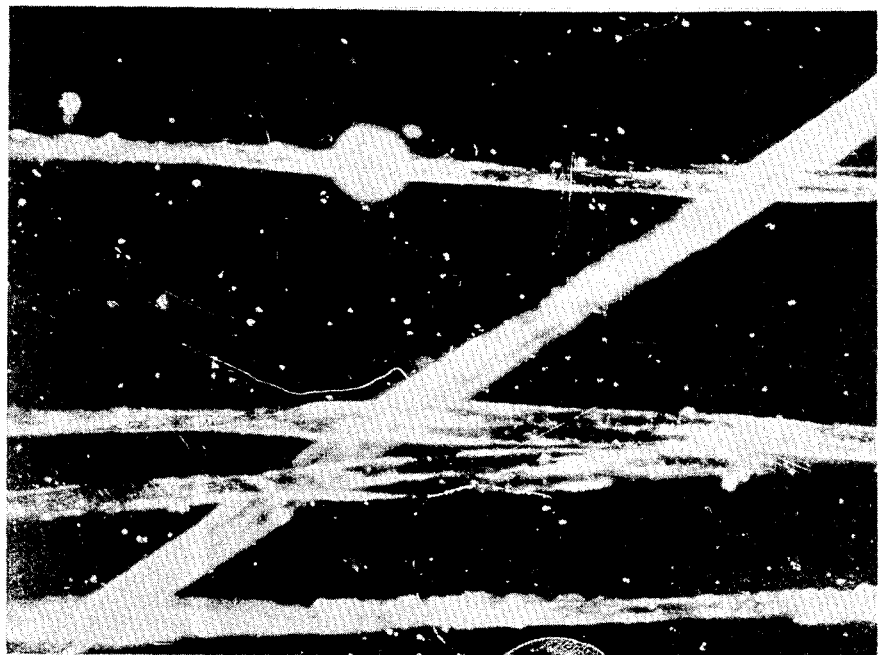
MICROPHOTO 2
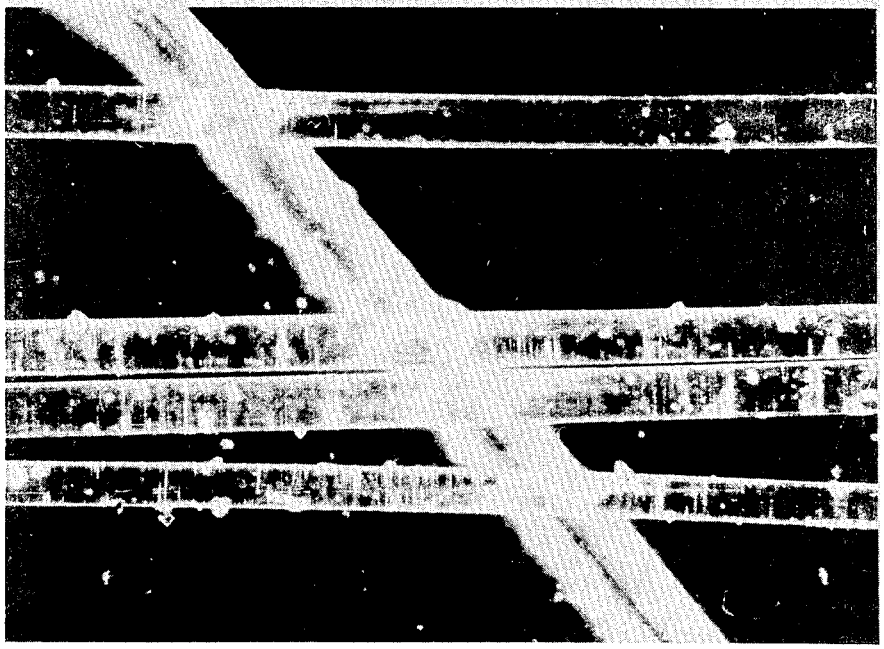
INVENTORS
CLAUDE LEDOUX
ALBERT de VRIES
BY
Bauer and Seymour
ATTORNEYS

UNITED STATES PATENT OFFICE
Certificate of Correction

Patent No. 3,548,049            December 15, 1970

Claude Ledoux et al.

It is certified that error appears in the above-identified patent and that said Letters Patent are hereby corrected as shown below.

In the heading to the printed specification, line 7, "No Drawing" should read —1 Sheet—.

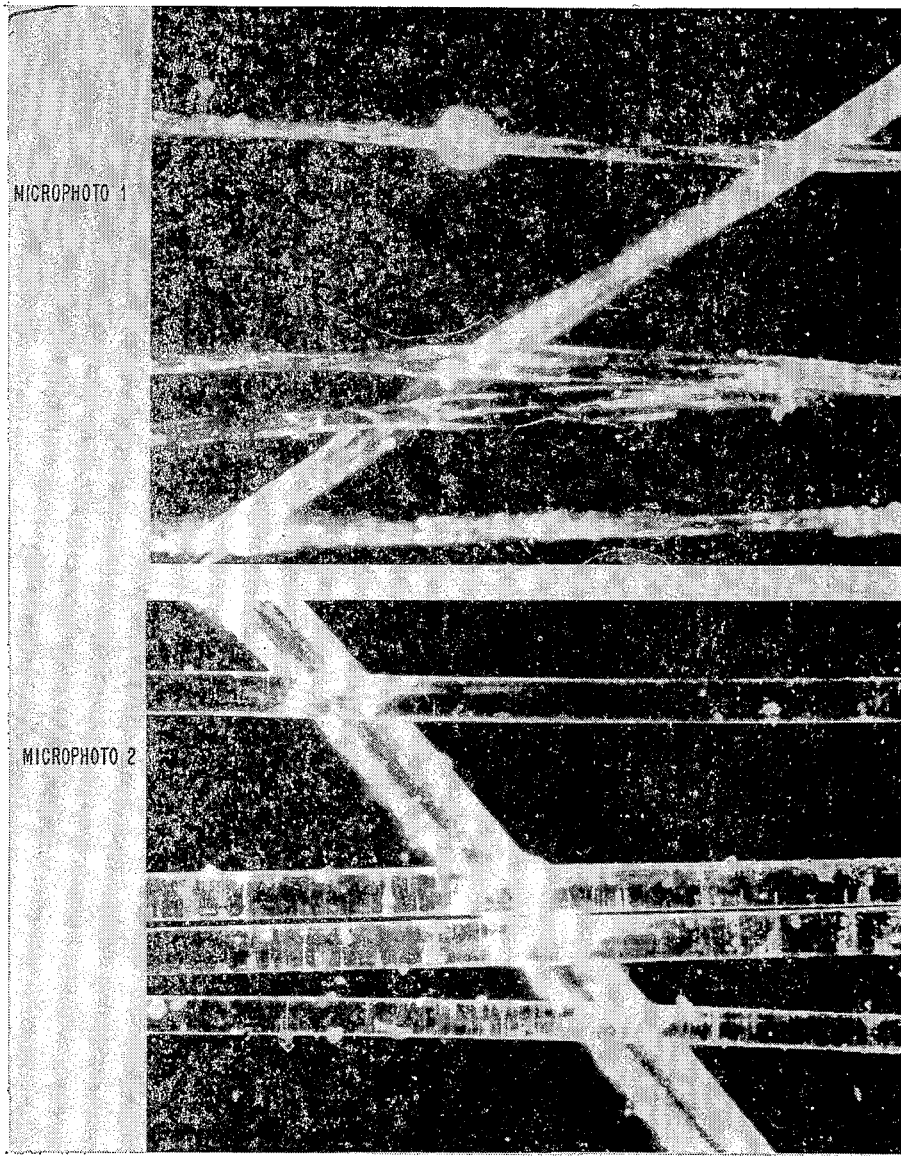

Signed and sealed this 7th day of December 1971.

[SEAL]

Attest:

EDWARD M. FLETCHER, JR.,             ROBERT GOTTSCHALK,
*Attesting Officer.*            *Acting Commissioner of Patents.*

United States Patent Office 3,548,049
Patented Dec. 15, 1970

3,548,049
PROCESS FOR SPINNING POLYVINYL CHLORIDE FIBERS
Claude Ledoux, Anthony, Haute de Seine, and Albert de Vries, Val de Marne, France, assignors to Produits Chimiques Pechiney Saint-Gobain, Paris, France
No Drawing. Filed Apr. 24, 1967, Ser. No. 638,177
Claims priority, application France, Apr. 27, 1966, 59,303; Mar. 3, 1967, 97,350
Int. Cl. B28b 3/20
U.S. Cl. 264—176                                12 Claims

ABSTRACT OF THE DISCLOSURE

Polyvinyl chloride is made into elongated shapes of uniform section. Production is by melting and extrusion, use of a solvent being eliminated.

---

This invention relates to the manufacture of polyvinyl chloride in elongated shapes of uniform section, which had not heretofore been accomplished. Polyvinyl chloride fibers can be made by this process, are of substantial importance, and this invention will be related in its application to their manufacture, it being understood that the process is equally applicable to the manufacture of other shapes the thickness of which is minimum compared to length, for instance ribbons, pellicles, plates.

Polyvinyl chloride has been made in shaped sizes of limited length by pressing in a mold but not in sizes of limitless length as by extrusion or other continuous production. By limitless is meant to distinguish between objects all the dimensions of which are fixed as made, compared to those of at least one intermediate dimension.

Heretofore it has been possible to make polyvinyl chloride fibers commercially only by dissolving the resin in a solvent, spinning the solution, and evaporating the solvent, leaving a warped and unequal fiber as viewed against a black background. Such fibers are of unequal strength, are unreproducible, contain solvent voids, and do not have uniform luster when viewed by any kind of light. While the properties of strength and resistance to solvents of polyvinyl chloride theoretically indicate the desirability of polyvinyl chloride fibers, the difficulties attending manufacture have prevented any substantial achievement of that objective. Proposals have been made to melt the fiber and extrude it but have not been attended by success because of the sensitivity of the material to degradation by heat.

It is an object of the invention to make polyvinyl chloride fibers of uniform section, uniform appearance and brilliant luster, transparent when desired, of any chosen cross section such as triangular, cylindrical, pellicular, having the full strength of the material, resistant to solvents such as the chlorinated organic solvents, and to make useful fibers not only of copolymers of polyvinyl chloride but also of mixtures of these resins with other resins which are normally compatible, and surprisingly, with resins such as the ethylenic and acrylate polymers which were formerly incompatible.

In the drawings,

Microphoto 1 shows a polyvinyl fiber made from solution in accordance with the prior art; and Microphoto 2 shows a polyvinyl fiber, at the same enlargement as microphoto 1, which was made in accordance with the present invention.

The objects are accomplished generally speaking by polyvinyl chloride in an elongated shape having an indeterminate dimension and a minimum section, the section of which is substantially uniform, and by a method of making a resinous composition from the class consisting of polyvinyl chloride and its copolymers, and their mixtures with compatible and previously incompatible resins into elongated shapes of minimum section which comprises flowing a stream of polyvinyl chloride in the absence of solvents and diluents toward shaping means, and homogenizing the part of the stream adjacent the shaping means, heating that part rapidly into the range of about 150° C. about to 220° C. thereby making it hot and plastic, shaping the hot, plastic resin in the shaping means drawing and cooling it, the heating, shaping, drawing and cooling of, the homogeneous resin being limited to a time on the order of a few seconds to tens of seconds.

The new fibers can be extruded, drawn, and made to rigid specifications of uniformity not previously attainable, even to the manufacture of rigorously exact transverse dimensions.

Comparison of the two microphotos furnishes an estimate of the comparative value of the new and the old fibers.

In the new process the fibers are made from a melt of the resin without the addition of solvent, being extruded from a spinnerette, for example, and drawn as they issue.

All types of polyvinyl chloride are useful in the process, e.g. those polymerized hot, those polymerized cold; all its copolymers, e.g. polyvinyl chloride polyvinylidene chloride, polyvinyl chloride acrylic nitrile; super chlorinated polyvinyl chloride; grafted polyvinyl chloride; and those in which the comonomer is ethylenic or acrylic. Particles of different polymers, e.g. polyvinyl chloride and polyvinylidene chloride can be rapidly homogenized and heated and extruded together, producing useful fibers of coordinate properties.

The process is of extreme rapidity, the completion of homogenization, extrusion drawing and the start of cooling being accomplished in less than a minute. To accomplish this the polyvinyl chloride flows in a stream toward the spinnerette, the stream is homogenized just before the spinnerette by the most vigorous working, which may itself impart a material rise in temperature, is heated to melting temperature either just before the spinnerette, or in or before the die of the spinnerette itself, and is cooled by air or in a liquid. Before it is cooled it may be subjected to drawing. The whole operation will take less than a minute and in many cases only from a few seconds to a few tens of seconds.

The temperatures employed will vary according to the quality (e.g. viscosity and mol weight) of the resin. An exemplary polyvinyl chloride was homogenized, melted, extruded, drawn, and cooled in fifteen seconds at a maximum temp. of 180° C. which was attained only for a few seconds.

A new machine has been described in French Pat. 1,461,-398 and U.S. application Ser. No. 584,438, now U.S. Pat. 3,411,180, which can be used in the present process, with the particular provision that it be driven at a minimum speed of 150 r.p.m.

The standard extrusion apparatus is useful, for instance spinnerets, usually with the addition of means to heat the spinnerette and the zones immediately adjacent to it through which the homogenized resin flows, to the temp. between 150 and 220° C. most useful with the particular resin.

The fiber takes a shape closely corresponding to the shape of the extrusion orifice, e.g. circular, elliptical, lobed, triangular, cruciform. Such shapes could not previously be produced.

The invention not only provides for the formation of such articles from polymers and copolymers but form mixtures of different polymers and copolymers, even those previously regarded as incompatible, and makes useful articles from them, for instance from mixtures of vinyl resins with olefinic and acrylic types.

The following examples illustrate the invention without detracting from the generality of what is elsewhere herein stated.

EXAMPLE 1

Granules of polyvinyl chloride of viscosity index 80 stabilized with a standard stabilizer flow in a stream toward a small but powerful homogenizer in which they are homogenized and fluidified at 180° C. The stream of molten polyvinyl chloride is immediately forced through a spinnerette having 350 holes of 1.5 mm. diameter, the spinnerette being held at 180° C. The passage through the extrusion apparatus took 10–15 seconds and the fibers issuing from it were drawn at 50 m./min. A thermal conditioning zone was provided at the discharge part of the spinnerette which permitted the drawing to be completed before the fibers were cooled to set temperature. Ordinary drawing and winding apparatus was used. Microscopic examination showed orientation, a diameter of 105 microns, and a value of 122 deniers. The section was uniformly circular. The following characteristics were determined:

Heat loss 15 H. at 60° C.—0
Stretch in boiling water—210%
Shrinkage in boiling water after being set—47%
Shrinkage in oil at 120° C.—16%
Shrinkage in perchlorethylene at 60° C.—2%
Shrinkage in trichloroethylene at 50° C.—20%
Strength of the undrawn fiber—0.77 g./denier
Elongation at rupture—83%
Strength of the drawn and set fiber—1.82 g./denier
Elongation of the drawn and set fiber—3.5%
Resistance of the set fiber released in boiling water—1.07 g./denier
Elongation of the drawn set, and released fiber—142%

Under the microscope at magnification of 80×, tested by a micrometric scale, the fibers were of substantially uniform diameter throughout their lengths. Against a black background they are seen to be transparent, and of great brilliance. The fibers made according to the prior art from solutions, viewed and tested alike, have irregular diameter, zones of striction and strangulation, and varying degrees of brilliance from point to point.

EXAMPLE 2

The apparatus of the U.S. previous application was used, its speed accelerated to 180 r.p.m., and it was supplied with polyvinyl chloride of index of viscosity 80 which had been stabilized with a standard prior art stabilizer and heated to 190° C., a fluid, homogeneous flow was obtained. When figures are given for viscosity in specification and claims, AFNOR viscosity is intended. The mean time of the flow in the extruder was 10–15 seconds. The flow was passed through a spinnerette heated to 220° C., drawing of the fibers at discharge was at 250 m./min. The fibers were cooled and gathered by classic methods. The fibers were as above, oriented, brilliant, true circles, and uniform with a mean diameter of 26 microns and a weight ratio of 31 deniers. Their properties were:

Weight ratio of undrawn fibers—31 deniers
Loss on heating 15 H. at 60° C.—0%
Draft in boiling water—200%
Shrinkage in boiling water after drawing and fixing—40%
Shrinkage in oil at 120° C., of drawn and fixed fibers—15%
Shrinkage in trichlorethylene at 50° C.—20%
Strength of drawn and fixed fibers—2.2 g./denier
Elongation, of drawn and fixed fibers—24%
Elongation after drawing, fixing, and shrinkage—100%

EXAMPLE 3

The conditions precedent were followed but a copolymer of vinyl chloride and propylene (95/5) was used. The same brilliance and uniformity was observed. The properties were:

Weight ratio—25 deniers
Loss at 60° C. after 15 H.—0%
Extensibility in boiling water—200%
Shrinkage in boiling water of the fibers drawn and fixed—45%
Shrinkage in oil at 120° C. of drawn and fixed fibers—34%
Shrinkage in trichlorethylene—30%
Strength, of drawn and fixed fibers—1.9 g./denier
Elongation at rupture of drawn and fixed fibers—30%
Elongation at rupture of drawn, fixed and retracted fibers—1.1 g./denier
Elongation at rupture of drawn, fixed and retracted fibers—130%

EXAMPLE 4

The apparatus employed had a small but high speed mixer, a short tube leading from the mixer to the spinnerette which was heated to 200° C., the spinnerette being heated to 220° C. A powder of mixed grains of polyvinyl chloride and polypropylene (90% to 10%) was supplied to the mixer and forced through the spinnerette. The speed of the extruded fibers measured after drawing was 150 meters per minute. The spinnerette had 200 rectangular holes 3 mm. on one side and 1.2 mm. on the other. Total time of heating approached 25 seconds. The temperature employed approached 220° C. The fibers were of uniform section, had a weight ratio of 35 deniers, had high and uniform luster, and retained their uniformity when drawn. Tests revealed the following properties:

Weight ratio of undrawn fibers—35 deniers
Weight loss at 60° C. after 15 H.—0%
Extensibility in boiling water—220%
Shrinkage of the drawn and set fibers in boiling water—32%
Further shrinkage in oil at 120° C.—20%
Shrinkage in trichlorethylene at 50° C.—32%
Strength in trichlorethylene at 50° C.—32%
Strength of the drawn and set fiber—2.75 g./denier
Elongation of the same at breaking—20%
Strength of the drawn, set and shrunk fiber—1.8 g/denier
Elongation of the same at rupture—70%.

EXAMPLE 5

The apparatus used was that which is described in the previous U.S. application a copolymer of vinylchloride and propylene (95–5) was extruded through a spinnerette having 150 holes of three lobes which produced a fiber having three longitudinal channels. Each hole had a 0.55 sq. millimeter of orifice. The fibers extruded were of the exact size and shape of the holes. Compression, melting and extrusion were almost simultaneous (temperature attained 150° C. and did not attain 220° C.). Cooling was in the air after drawing. Drawing was between 80 and 100° C. The part of the stream of copolymer subjected to heating was only that portion nearest the extrusion means.

It is to be understood that there are optimum conditions for each type of fiber, related to composition and molecular weight. This fiber had these properties:

Undrawn fiber—40 deniers
Loss at 60° C. in 15 H.—0%
Elongation in boiling water—200%
Shrinkage of drawn and set fiber in boiling water—46%
Shrinkage in oil at 120° C. of the foregoing—35%
Shrinkage in trichlorethylene at 50° C.—31%
Strength of drawn and set fiber—1.7 g./denier
Elongation at rupture—30%
Strength of shrunk fiber—0.99 g./denier
Elongation of stretched set and shrunk fiber at rupture—130%

EXAMPLE 6

Conditions were as in Example 5 but the spinnerette had 350 circular holes 1.5 mm. in diameter and the resin was a 90-10 mixture of polyvinyl chloride and polypropylene, not a copolymer. The spinnerette was at 220° C. and drawing was at 250 m./min. The fibers tested thus:

Undrawn fibers—28 deniers
Loss at 60° C. in 15 H.—0%
Elongation in boiling water—230%
Shrinkage of the drawn and set fiber in boiling water—30%
Shrinkage in oil at 120° C. of the drawn, set, and shrunken fiber—18%
Shrinkage in 50° C. trichlorethylene—30%
Strength of the drawn and set fiber—3.5 g./denier
Elongation at rupture of the drawn and set fiber—20%
Strength of the drawn, set and shrunken fiber—2.05 g./denier
Elongation of the foregoing at rupture—70%

EXAMPLE 7

Using conditions similar either to Example 6 and a mixture of 95% by weight polyvinyl chloride and 5% polymethylmethacrylate produced fibers having the qualities:

Undrawn—36 deniers
Loss on heating—0%
Stretch in boiling water—200%
Shrinkage after drawing and setting—45%
Shrinkage in hot oil after shrinking in hot water—32%
Shrinkage in trichlorethylene at 50° C.—30%
Strength of the drawn and set fiber—2.5 g./denier
Elongation at rupture—24%
Strength after setting and retraction—1.15 g./denier
Elongation of the foregoing at rupture—100%

EXAMPLE 8

Fabrics have been made on one hand with the novel fibers and on another hand with the fibers prepared according to process of the prior art. In both cases pure polyvinylchloride has been used in the fibers.

Fibers have been spun according to the novel process from polyvinyl chloride of index of viscosity 80. Each fiber had a weight ratio of 4.1 deniers after having been drawn at 950 m./min.

These fibers have been used to prepare yarns themselves woven to form a fabric in the canvas type having the following characteristics:

Weight _____ 140 g./sq. m.
Warp:
    Weight ratio _____ 200/64 deniers.
    Twisting _____ 50 r./m. Z.
    Number of threads_____ 28/cm.
Filling:
    Weight ratio _____ 200/64 deniers.
    Twisting _____ 50 r./m. Z.
    Number of threads_____ 25/cm.
Strength measured according to the French Norm _____ G 07001.
    Warp _____ 125 kg.
    Filling _____ 107 kg.
Sizes stability after 30 min. in perchlorethylene at 25° C.:
    Shrinkage—
        Warp _____ Less than 1%.
        Filling _____ 0.
After 30 min. in trichlorethylene at 25° C.:
    Shrinkage—
        Warp _____ 18%.
        Filling _____ 13.5%.

A same fabric made with fibers of equal sizes but prepared according to the prior art, has the following characteristics:

Strength—
    Warp _____ 71.4 kg.
    Filling _____ 62.7 kg.
    Size stability after 30 min. in perchlorethylene at 25° C.:
    Shrinkage—
        Warp _____ 6%.
        Filling _____ 2%.
After 30 min. in trichlorethylene at 25° C.:
    Shrinkage— 30%.
        Warp _____ 22.5%.
        Filling _____

The fibers are useful in all types of fabrics, rugs, curtains, cloth and in all situations where thermoplastic fibers are useful.

The fibers are the first of polyvinyl chloride base which are uniform in their useful properties, for instance having homogeneous composition, uniformity of size and strength, resistance to chemicals such as halogenated hydrocarbon solvents, and uniformity of thermal response. In appearance either by naked eye, by magnification, or by photography the homogeneity and uniformity are superior to anything previously known. In cases involving mixtures of resins as distinguished from copolymers, homogeneity of composition may be lacking in appearance, two or more phases being visible under the microscope, but homogeneity of properties is still present even in cases where the resins used were previously deemed too incompatible to be used together. In shape, total superiority is established because the resins can be extruded in the exact shape desired, which was totally impossible with solvent systems of manufacture. Exact reproducibility of any fiber in composition, appearance, and shape is achieved by this invention, a fact which in itself vastly extends the use of polyvinyl chloride polymers and mixtures.

The new fibers may be flexible or stiff, thick or thin, solid or tubular, depending on the construction of the extrusion orifice. The shapes may be pellicular, e.g. like ribbons, and of all other shapes of equal or different transverse and vertical dimensions.

Modifiers may be included during the mixing, such as are normally used with such compositions, for instance plasticizers and fillers. Inclusion of materials such as solvents capable of creating voids, is to be avoided except when, for reasons pertaining to appearance, voids are desired in the fiber, in which case loss of novel properties is to be expected.

The novel fibers when extruded as pure resins are normally transparent and of high luster. Delustering agents heretofore satisfactory with polyvinyl chloride may be included before or after extrusion. In cases where mixed resins produce a plurality of phases, novelty of attractive appearance follows, sometimes accompanied by internal reflection and refraction of light.

The physical and chemical characteristics of the novel products having an indeterminate dimension and minimum section are superior to anything previously known in materials of polyvinyl chloride base, compared composition to composition.

The foregoing description is exemplary, not limitative.

What is claimed is:

1. A method of making homopolymeric polyvinyl chloride into elongated shapes of minimum and uniform section which comprises continuously moving solid polyvinyl chloride in the absence of solvents and diluents toward shaping means, homogenizing the part of the stream immediately adjacent the shaping means by vigorously working the said part while heating that part rapidly until it is hot and plastic, shaping the hot, plastic polyvinyl chloride in the said shaping means at similar plasticizing temperature, and cooling the shaped polyvinyl chloride after it leaves the shaping means, the heating, shaping, and cooling of the polyvinyl chloride being limited to less than a minute and being generally on the order of a few seconds to a few tens of seconds.

2. The method of claim 1 in which the shaped resin is drawn as it leaves the shaping means.

3. A method of shaping homopolymeric vinyl chloride free of solvents and diluents into shapes, including ribbons, fibers, pellicles, bristles and thin plates, of strictly regular cross-section, homogeneous in structure, resistant to chlorinated organic solvents and to heat, highly transparent and of high polish, which comprises heating the polyvinyl chloride to plastic temperature, subjecting it to centripetal shearing and mixing at a plastic temperature suitable to extrusion, extruding it in the desired shape, drawing it, and cooling the shaped resinous compositions obtained, the entire process from said heating to the completion of cooling taking less than a minute.

4. The method of claim 3, in which the drawing is carried out at a speed of from about 50 to 250 m./min.

5. The method of claim 3, in which the shape issuing from the shaping means is drawn during cooling.

6. The method of claim 1 in which the polyvinyl chloride, after the vigorous working, is shaped by extrusion.

7. The method of claim 6 in which the polyvinyl chloride is extruded in fiber form.

8. The method of claim 6 in which the said vigorous working includes centripetal shearing and mixing of the polyvinyl chloride immediately preceding the said extrusion.

9. The method of making homopolymeric polyvinyl chloride fiber which comprises moving a stream of particulate polyvinyl chloride free of solvents and diluents toward extrusion means heated to extrusion temperature, heating the part of the stream contiguous to the extrusion means rapidly to extrusion temperature while working and homogenizing it by centripetal shearing action, extruding it, and cooling it, the heating, extruding, and cooling requiring less than a minute.

10. The method of claim 9 in which the fiber is drawn after extrusion and before cooling.

11. The method of claim 9 in which the fiber is drawn after extrusion and cooling.

12. The method according to claim 1 in which the time of heating and shaping the mass is equivalent to about 10 to 15 seconds for polyvinyl chloride having an index of viscosity about 80.

References Cited

UNITED STATES PATENTS

| | | | |
|---|---|---|---|
| 3,097,991 | 7/1963 | Miller et al. | 162—157 |
| 3,009,208 | 11/1961 | Pirot | 264—184X |
| 3,099,067 | 7/1963 | Merriam et al. | 264—344X |
| 3,234,313 | 2/1966 | Miller et al. | 264—230 |
| 3,372,219 | 3/1968 | Gord | 264—210 |
| 3,382,305 | 5/1968 | Breen | 264—171 |
| 3,303,253 | 2/1967 | Henry | 264—176 |
| 3,411,180 | 1967 | Ledaux et al. | 18—12 |
| 3,444,269 | 5/1969 | Beer | 260—876 |

FOREIGN PATENTS

| | | | |
|---|---|---|---|
| 1,385,171 | 11/1964 | France | 264—Mixed resin |
| 1,377,244 | 9/1964 | France | 264—Mixed resin |
| 1,369,199 | 6/1964 | France | 264—Mixed resin |
| 1,411,097 | 8/1965 | France | 264—Mixed resin |

OTHER REFERENCES

"The Extrusion of Unplasticized P.V.C. Film," by A. E. Parker, British Plastics, 32 (10), pp. 456–459, October 1959.

JULIUS FROME, Primary Examiner

J. H. WOO, Assistant Examiner

U.S. Cl. X.R.

264—349